United States Patent Office

2,803,604
Patented Aug. 20, 1957

2,803,604
HEAT EXCHANGE COMPOSITIONS

Arthur D. Meighen, Terre Haute, Ind., assignor to Commercial Solvents Corporation, Terre Haute, Ind., a corporation of Maryland No Drawing. Application December 24, 1954,
Serial No. 477,586

6 Claims. (Cl. 252—75)

My invention relates to novel anti-corrosion agents. More particularly, it relates to heat exchange media containing novel anti-corrosion agents.

Both water alone and aqueous solutions of water-soluble alcohols are commonly employed as heat exchange media. One of the most extensive uses of these heat exchange media is in the cooling systems of internal combustion engines. Water alone is employed as a heat exchange medium in such cooling systems in tropical areas and during the warm months generally. Aqueous solutions of water-soluble alcohols are employed during the cold months of the year in order to afford protection against freezing for the cooling systems. However, other applications are made of these heat exchange media than in internal combustion engine cooling systems, such as stationary heat exchangers employed in industry. My invention is useful in all these applications for inhibiting corrosion of the metals in the heat exchange systems.

It has long been known that inclusion of small amounts of certain corrosion inhibiting substances in aqueous heat-exchange media such as water and antifreeze compositions containing both water and water-soluble alcohols, substantially decreases the corrosion of the various metals making up the heat exchange systems. In recent years it has been discovered that improved corrosion inhibition in such heat exchange media results from the use of several such substances as mixed corrosion inhibitors. However, the mixed corrosion inhibitors employed heretofore have certain disadvantages. For example, certain of the components often tend to lose their effectiveness before others of the mixture with the result that the mixture no longer serves as an anti-corrosion agent. Of equal, if not greater importance, is the fact that most systems with which heat exchange media come in contact contain several different metals as well as solder. Many agents which are effective as anti-corrosion agents for a particular metal are actually corrosive to another metal of the systems. This results in the necessity for including a second agent to neutralize the corrosive effect of the first. It may then be necessary to add still another agent to counteract some ill effect of this second agent. The correct selection of combinations of agents and the selective amounts thereof to give an effective anti-corrosion agent, therefore, requires a high degree of skill.

In addition, the stability of the inhibited antifreezes and their containers upon storage before distribution to the final consumer must be considered. Many antifreezes which are anticorrosive when diluted with water for use in heat exchange systems break down rapidly and attack metal containers upon storage before dilution. This breakdown of the antifreeze composition is particularly prevalent in the case of ethylene glycol antifreezes. It may take the form of unpleasant odors or dark, insoluble precipitates formed by degradation products of the anticorrosion agents employed. The container attack upon storage may range from a relatively mild pitting to such pronounced corrosion as to cause leaks in the metal containers after storage for as short a period as one year or less. Therefore, the correct selection of anticorrosion agents must also result in a combination of agents which are stable upon storage for prolonged periods in the concentrated antifreeze composition.

I have now discovered novel anti-corrosion compositions which render heat exchange media substantially non-corrosive toward the metals commonly used in heat exchange systems, which remain stable and effective for long periods of time, and which are stable upon protracted storage in antifreeze compositions. These new anti-corrosion compositions comprise mixtures of a benzotriazole compound, a member selected from the group consisting of alkali metal arsenites, alkali metal arsenates, alkali metal molybdates, and mixtures thereof, and a material suitable for maintaining the pH of an aqueous solution of the said anti-corrosion agents within the range of from about 7.5 to about 10.5.

The heat exchange compositions which employ my new synergistic anti-corrosion compositions herein described may contain as the major ingredient water, water and a water-soluble alcohol freezing point depressant, or the water-soluble alcohol freezing point depressant alone suitable for use in a heat exchange system when diluted with water to an alcohol content of from about 10% to about 60% by volume, as for example, in automotive cooling systems.

The water-soluble alcohols which can be inhibited by my new anti-corrosion compositions include the lower monohydroxy alcohols and the lower aliphatic glycols commonly employed as freezing point depressants in antifreeze compositions such as methanol, ethanol, ethylene glycol, and propylene glycol.

The benzotriazole compounds useful in my compositions include benzotriazole, the alkali metal or ammonium salts, or mixtures thereof, N-methylbenzotriazole, etc. The alkali metal arsenite, arsenate, or molybdate used in my composition can be the corresponding sodium, potassium, or other alkali metal salts. I have, for example, found the sodium and the potassium salts to be equally effective.

I have found that a composition including a mixed corrosion inhibitor of these two specified ingredients demonstrates synergistic action in the control of corrosion in heat exchange media. However, in order to maintain their anti-corrosive effectiveness over prolonged periods of use, I have found it necessary to include in my composition a material which is effective to maintain the pH of the heat exchange media between about 7.5 and 10.5. I have found that a number of common materials are effective to maintain a pH within this range. They include the alkali metal borates, such as sodium metaborate, potassium metaborate, sodium tetraborate, and potassium tetraborate, calcium borate, the 2-hydroxyalkyl-ammonium borates, such as 2-hydroxyethylammonium borate, tris-(2-hydroxyethyl)ammonium borate and (hydroxy-t-butyl)ammonium borate, the 2-hydroxyalkylammonium phosphates, such as tris-(2-hydroxyethyl)ammonium phosphate, the 2-hydroxyalkylamines, such as 2-hydroxy-ethylamine and tris-(2-hydroxyethyl)amine, the dibasic alkali metal phosphates and urea.

I have found that my new synergistic anti-corrosion agent can consist of a percentage composition ranging from about 2.2% to about 80% by weight of a member selected from the group consisting of alkali metal arsenites, alkali metal arsenates, alkali metal molybdates, and mixtures thereof, from about 0.2% to about 77% of a benzotriazole compound and from about 11% to about 96% of a material suitable for maintaining the pH of an aqueous solution of the composition within the range of from about 7.5 to about 10.5. The three ingredients of my new anticorrosive compositions may be varied independently of each other so long as the minimum percentage of each is present. The total percentage composition obviously does not exceed 100% in any case. A composition possessing any percentage composition within these ranges is suitable for addition to any aqueous heat exchange medium, including water or antifreeze mixtures, used in an automotive cooling system for inhibiting the corrosive effects thereof.

However, in order to realize the desired inhibitory effect in a water-soluble alcohol antifreeze composition, I have found that my new anti-corrosive agents must be added in an amount sufficient to produce concentrations of from about 0.01% to about 2.0% of the benzotriazole compound, from about 0.1% to about 2.0% of a member selected from the group consisting of alkali metal arsenites, alkali metal arsenates, alkali metal molybdates, and mixtures thereof, and from about 0.5% to about 2.5% of a material suitable for maintaining the pH of an aqueous solution of the anticorrosion agent within the range of from about 7.5 to about 10.5. These percentage compositions are based on the weight of the water-soluble alcohol ingredient. If the concentrations stated are present in an antifreeze composition, then that composition, when diluted for use to a water-soluble alcohol content of from about 10% to about 60% by volume will be substantially non-corrosive to the metals commonly used in automotive cooling systems, and will remain substantially non-corrosive through prolonged use.

Moreover, I have found that my new anticorrosion agents when present in an antifreeze composition in the indicated amounts will render that composition stable upon prolonged storage in commercial containers, including metal cans. Extensive storage tests of typical antifreeze compositions comprising ethylene glycol and my new anticorrosion agents in quarter pound electro tin plate cans over storage periods of up to 6 months at both ambient and abnormally high storage temperatures resulted in fully satisfactory product stability and no deleterious container attack.

Furthermore, I have found that my new anti-corrosion agents can be added to water alone or antifreeze compositions of water and water-soluble alcohols already adjusted to the dilution for use. If my agents are added in amounts sufficient to produce concentrations of from about 0.002% to about 0.4% of the benzotriazole compound, from about 0.02% to about 0.4% of the member selected from the group consisting of alkali metal arsenites, alkali metal arsenates, alkali metal molybdates, and mixtures thereof, and from about 0.1% to about 0.5% of a material suitable for maintaining the pH of the aqueous solution within the range of from about 7.5 to about 10.5, the water or diluted antifreeze composition is thereby rendered substantially non-corrosive for long periods of use. Thus, my new anti-corrosion agents can be used to inhibit corrosion by water and by already diluted antifreeze compositions and to reinhibit antifreeze compositions in which the corrosion inhibitors have become exhausted.

For purposes of inclusion in water and diluted antifreeze compositions, my new anticorrosion agents can conveniently be packaged as concentrated aqueous solutions for ready addition to such heat exchange media. When my new mixed corrosion inhibitors are intended for use in automotive cooling systems containing water alone as a coolant, it is sometimes desirable to include in the aqueous concentrate of anticorrosion agents a so-called "soluble oil" for purposes of lubrication. Such "soluble oils" generally are medium viscosity mineral oils containing added emulsifiers to render them easily emulsifiable in water. Irrespective of whether such a "soluble oil" has any observable anticorrosive effect as an emulsion in water, the use of my new anticorrosion agents therewith greatly enhances the total anticorrosive effect.

The following table sets forth a comparision of my new anticorrosion agents with various amounts of the individual synergistic corrosion inhibiting compounds, when each is included in a typical antifreeze composition. Table I reports the results of static corrosion tests of two weeks duration using test discs of all metals commonly used in heat exchange systems. The brass, copper, solder, and steel discs had a surface area of 17.0 square cm., while the aluminum and cast iron discs had an area of 22.8 square cms. The amounts of each corrosion inhibiting ingredient are stated as the concentration in ethylene glycol which was diluted with water to an ethylene glycol concentration of 20% by volume for testing. From these data it is seen that the mixed corrosion inhibitor of the first formula is composed 71.5% sodium arsenite, and 28.5% sodium benzotriazole included in the glycol at a concentration of 0.7% by weight and in the diluted antifreeze at a concentration of 0.14% by weight. The results are recorded as the loss of metal in milligrams from each test disc.

*TABLE I*

| Formula | Glycol Conc., percent | Weight loss, mgs. | | | | | |
|---|---|---|---|---|---|---|---|
| | | Alum. | Brass | Copper | Solder | Steel | Cast Iron |
| 0.5% Sodium arsenite<br>0.2% Sodium benzotriazole<br>Trace of dye | 20 | 0.8 | 0.5 | 2.2 | 1.6 | 0.1 | 0.9 |
| 0.5% Sodium arsenite<br>0.2% Sodium benzotriazole<br>1.0% Sodium metaborate | 20 | 1.1 | 0.2 | 0.6 | 2.4 | 0.2 | 0.7 |
| 0.2% Sodium benzotriazole | 20 | 22.8 | 1.7 | 0.6 | 12.0 | 1.2 | 236.5 |
| 2.0% Benzotriazole | 20 | 69.2 | 2.0 | 2.6 | 3.2 | 5.2 | 274.6 |
| 0.5% Sodium arsenite | 20 | 10.4 | 3.0 | 2.1 | 4.0 | 2.2 | 148.0 |

In Table II are set forth results of additional two-week static corrosion tests on the same size and type metal discs as in Table I above which demonstrate the equivalence of sodium arsenate and sodium molybdate to the sodium arsenite ingredient of my new anticorrosion agents. The amounts of these ingredients are stated as the concentration in ethylene glycol which is then diluted for testing. The equivalence of benzotriazole and N-methylbenzotriazole is also shown in Table II.

*Table II*

| Formula | Glycol Conc., percent | Weight loss, mgs. | | | | | |
|---|---|---|---|---|---|---|---|
| | | Alum. | Brass | Copper | Solder | Steel | Cast Iron |
| 0.5% Sodium arsenite<br>0.2% Benzotriazole | 20 | 0.3 | +0.4 | +0.7 | 0.4 | +0.1 | 8.1 |
| 0.5% Sodium arsenate<br>0.1% Benzotriazole | 20 | 12.6 | 0.4 | 1.0 | 2.9 | 3.2 | 5.7 |
| 0.5% Sodium molybdate<br>0.1% Benzotriazole | 20 | +1.1 | 0.4 | 1.1 | +11.3 | 0.6 | 1.7 |
| 0.5% Sodium Arsenite<br>0.2% N-Methylbenzotriazole | 20 | 2.2 | +0.3 | +1.0 | 1.7 | +0.9 | 14.2 |

In Table III are set forth results of additional two-weeks static corrosion tests on the same size and type metal discs which demonstrate the range of percentage composition of the benzotriazole compound in my new anticorrosion agents which is effective in the prevention of corrosion in heat exchange systems. The amounts of each ingredient are stated as the concentration in ethylene glycol which is then diluted for testing.

In Table V are set forth results of additional two-week anticorrosion tests on the same size and type metal discs as in Table I above which demonstrate the range of percentage composition of the pH maintaining material and the equivalence of a number of such materials in my new anticorrosion agents. The amounts of each ingredient are stated as the concentration in ethylene glycol which is then diluted to an ethylene glycol concentration of 20% for testing.

*Table III*

| Formula | Glycol Conc., percent | Weight loss, mgs. | | | | | |
|---|---|---|---|---|---|---|---|
| | | Alum. | Brass | Copper | Solder | Steel | Cast Iron |
| 0.5% Sodium arsenite<br>1.0% Sodium tetraborate<br>0.012% Sodium benzotriazole | 20 | 0.4 | 1.7 | 2.1 | 2.4 | 0.7 | 2.2 |
| 0.5% Sodium arsenite<br>1.0% Sodium metaborate<br>0.025% Sodium benzotriazole | 20 | +1.4 | 1.8 | 1.9 | 1.8 | 1.4 | 2.0 |
| 0.5% Sodium arsenite<br>1.0% Sodium metaborate<br>0.05% Sodium benzotriazole | 20 | 1.4 | 1.6 | 2.6 | 2.3 | 1.7 | 0.9 |
| 0.5% Sodium arsenite<br>1.0% Sodium tetraborate<br>0.075% Sodium benzotriazole | 20 | 0.5 | 1.6 | 2.2 | 0.9 | 1.9 | 1.9 |
| 0.5% Sodium arsenite<br>1.0% Sodium metaborate<br>0.1% Sodium benzotriazole | 20 | +0.5 | 2.0 | 2.7 | 2.3 | 2.2 | 1.2 |
| 0.5% Sodium arsenite<br>1.0% Sodium tetraborate<br>0.2% Benzotriazole | 20 | +0.3 | +0.3 | +0.4 | 0.5 | +0.8 | 4.7 |
| 2.0% Sodium arsenite<br>1.0% Benzotriazole | 20 | 3.1 | 1.5 | 3.7 | 0.7 | +1.3 | +2.3 |
| 2.0% Sodium arsenite<br>2.0% Benzotriazole | 20 | 1.9 | 3.5 | 4.4 | 0.2 | +0.2 | +2.6 |

In Table IV are set forth results of additional two-week static corrosion tests on the same size and type metal discs which demonstrate the range of percentage composition of the sodium arsenite ingredient in my new anticorrosion agents which is effective in the prevention of corrosion in heat exchange systems. The amounts of each ingredient are stated as the concentration in ethylene glycol which is then diluted for testing.

*Table V*

| Formula | Weight loss, mgs | | | | | |
|---|---|---|---|---|---|---|
| | Alum. | Brass | Copper | Solder | Steel | Cast Iron |
| 0.2% Benzotriazole, 0.5% Sodium Arsenite— | | | | | | |
| Plus 0.5% Sodium tetraborate | 2.0 | +0.6 | +0.7 | +0.4 | +0.7 | 4.3 |
| Plus 1.0% Sodium tetraborate | +0.3 | +0.4 | 0.5 | +0.8 | 4.7 |
| Plus 2.0% Sodium tetraborate | +0.3 | +0.6 | +0.5 | +0.2 | +0.6 | 0.9 |
| Plus 2.0% Sodium tetraborate | 0.1 | +0.5 | +0.8 | 0.1 | +0.6 | +1.4 |
| Plus 2.5% Sodium tetraborate | +3.0 | +0.9 | +0.9 | +0.3 | +0.1 | 0.1 |
| Plus 1.0% Sodium metaborate | +0.2 | +0.6 | +0.6 | 0.0 | +0.5 | +0.2 |
| Plus 1.0% Potassium metaborate | +3.3 | +0.9 | +0.6 | 0.6 | +0.5 | 1.4 |
| Plus 1.0% Potassium tetraborate | 1.3 | 0.0 | +0.7 | 26.6 | +0.6 | +0.5 |
| Plus 1.0% Calcium borate | +3.4 | +0.2 | +0.9 | 0.1 | +0.4 | 1.2 |
| Plus 1.0% (Hydroxy-t-butyl)-ammonium borate | +1.3 | 1.4 | 2.1 | 0.4 | 0.3 | +0.9 |
| Plus 1.0% 2-hydroxyethylamine | +4.5 | +0.3 | +0.8 | 0.4 | +0.7 | +1.5 |
| Plus 1.0% Tris-(2-hydroxyethyl)amine | +4.0 | 0.4 | +0.8 | 0.7 | 0.2 | 0.9 |
| Plus 1.0% hydroxy-t-butylamine | +0.3 | +0.5 | 1.9 | 0.8 | +0.3 | 15.1 |
| Plus 1.0% Disodium hydrogen phosphate | +0.4 | 0.0 | +0.9 | 0.3 | 0.1 | 3.5 |
| Plus 1.0% Urea | | | | | | |

In Table VI are set forth the results of 60-day circulating corrosion tests of my new antifreeze composition containing varying amounts of the benzotriazole compound. In these tests, six sets of metal test discs of the same description as those used in the static tests are subjected to a continuously circulated medium at approxi-

*Table IV*

| Formula | Glycol Conc., percent | Weight loss, mgs. | | | | | |
|---|---|---|---|---|---|---|---|
| | | Alum. | Brass | Copper | Solder | Steel | Cast Iron |
| 0.3% Benzotriazole<br>0.1% Sodium arsenite | 20 | 15.6 | +1.0 | +1.7 | +0.1 | 0.2 | 110.6 |
| 1.0% Benzotriazole<br>0.2% Sodium arsenite | 20 | 22.5 | 0.0 | +0.4 | +0.4 | +0.5 | 86.0 |
| 0.2% Benzotriazole<br>0.5% Sodium arsenite | 20 | 0.3 | +0.4 | +0.7 | 0.4 | +0.1 | 8.1 |
| 0.02% Benzotriazole<br>2.0% Sodium arsenite | 20 | 17.2 | +0.7 | +0.4 | 0.0 | +1.2 | +2.3 |
| 0.3% Benzotriazole<br>2.0% Sodium arsenite | 20 | 13.7 | 0.2 | 0.1 | 0.3 | +1.1 | +2.2 | mately 160° F. and the sets withdrawn at 10-day intervals. The amounts of each ingredient are stated as the concentration in ethylene glycol which is then diluted for testing. Weight losses of the discs are recorded in mgs.

*Table VI*

| Formula | Glycol Conc., Percent | Days Run | Weight loss, mgs. | | | | | |
|---|---|---|---|---|---|---|---|---|
| | | | Alum. | Brass | Copper | Solder | Steel | Cast Iron |
| 0.5% Sodium arsenite<br>1.0% Sodium metaborate<br>0.025% Sodium benzotriazole | 20 | 10<br>20<br>30<br>40<br>50<br>60 | +2.8<br>6.3<br>16.8<br>15.8<br>1.8<br>31.3 | 2.0<br>1.9<br>2.7<br>3.8<br>2.7<br>2.6 | 1.8<br>1.8<br>3.3<br>4.1<br>1.5<br>2.2 | 2.0<br>3.1<br>8.7<br>4.6<br>3.3<br>5.6 | 0.4<br>0.6<br>2.0<br>2.2<br>2.0<br>8.4 | 1.0<br>27.1<br>12.2<br>10.4<br>9.8<br>87.6 |
| 0.5% Sodium arsenite<br>1.0% Sodium metaborate<br>0.2% Sodium benzotriazole | 20 | 10<br>20<br>30<br>40<br>50<br>60 | 75.1<br>24.3<br>28.6<br>41.5<br>41.0<br>57.7 | 2.7<br>2.6<br>2.6<br>3.7<br>3.9<br>4.6 | 2.1<br>1.5<br>1.7<br>3.0<br>2.5<br>3.0 | 3.8<br>5.7<br>4.9<br>6.6<br>4.5<br>10.8 | 2.5<br>2.1<br>2.0<br>2.2<br>2.7<br>9.3 | 2.8<br>4.1<br>3.2<br>9.6<br>19.3<br>19.5 |
| 0.5% Sodium arsenite<br>1.0% Sodium tetraborate<br>0.075% Benzotriazole | 20 | 10<br>20<br>30<br>40<br>50 | +1.5<br>31.9<br>31.9<br>35.6<br>50.5 | 2.8<br>0.5<br>1.1<br>1.8<br>3.5 | 4.3<br>2.2<br>2.3<br>2.7<br>2.7 | 6.9<br>2.9<br>3.7<br>3.8<br>3.5 | 2.3<br>3.4<br>1.5<br>8.1<br>33.0 | 6.1<br>4.7<br>9.7<br>10.2<br>96.1 |
| 0.5% Sodium arsenite<br>1.0% Sodium tetraborate<br>0.075% Benzotriazole | 50 | 10<br>20<br>30<br>40<br>50 | +1.2<br>7.2<br>6.0<br>6.2<br>0.3 | 3.3<br>1.3<br>1.7<br>1.2<br>1.0 | 4.4<br>2.2<br>3.3<br>2.4<br>2.5 | 5.5<br>3.6<br>2.9<br>3.5<br>4.3 | 2.1<br>0.2<br>0.1<br>0.2<br>+0.5 | 4.9<br>1.7<br>3.2<br>0.8<br>1.4 |

In Table VII are set forth results of an additional two-week static corrosion test on the same size and type metal discs as in Table I above which demonstrate that my new anticorrosion agents are effective in the prevention of corrosion in heat exchange systems using water as the heat exchanging medium. The amount of each ingredient is stated as the concentration in water used.

*Table VII*

| Formula | Alum. | Brass | Copper | Solder | Steel | Cast Iron |
|---|---|---|---|---|---|---|
| 0.04% Benzotriazole<br>0.1% Sodium Arsenite<br>0.2% Disodium hydrogen phosphate | 6.1 | +0.7 | +0.9 | 1.1 | 0.2 | 12.5 |

I do not intend to be limited to the specific amounts, procedures, and materials disclosed in the above tables. The scope of my invention is as set forth in this specification and the appended claims.

Now having described my invention, what I claim is:

1. An antifreeze composition consisting essentially of a water-soluble alcohol selected from the group consisting of ethylene glycol and methanol as the chief non-aqueous ingredient and an anticorrosion agent comprising as the essential anticorrosive components from about 0.2% to about 77% of a compound selected from the group consisting of benzotriazole, alkali metal and ammonium salts of benzotriazole, mixtures of alkali metal and ammonium salts of benzotriazole, and N-alkyl benzotriazole, from about 2.2% to about 80% of a member selected from the group consisting of alkali metal arsenites, alkali metal arsenates, alkali metal molybdates, and mixtures thereof, and from about 11% to about 96% of a material suitable for maintaining the pH of an aqueous solution of the said anticorrosion agent within the range of from about 7.5 to about 10.5, which anticorrosion agent is present in the antifreeze composition in an amount sufficient to produce concentrations of from about 0.01% to about 2.0% of the benzotriazole compound, from about 0.1% to about 2.0% of the member selected from the group consisting of alkali metal arsenites, alkali metal arsenates, alkali metal molybdates, and mixtures thereof, and from about 0.5% to about 2.5% of the material suitable for maintaining the pH of the finished heat exchange medium within the range of from about 7.5 to 10.5 based on the weight of the water-soluble alcohol.

2. An antifreeze composition consisting essentially of a water-soluble alcohol selected from the group consisting of ethylene glycol and methanol as the chief non-aqueous ingredient and an anticorrosion agent comprising as the essential anticorrosive components from about 0.2% to about 77% of a compound selected from the group consisting of benzotriazole, alkali metal and ammonium salts of benzotriazole, mixtures of alkali metal and ammonium salts of benzotriazole, and N-alkyl benzotriazole, from about 2.2% to about 80% sodium arsenite, and from about 11% to about 96% sodium metaborate, which anticorrosion agent is present in the antifreeze composition in an amount sufficient to produce concentrations of from about 0.01% to about 2.0% of the benzotriazole compound, from about 0.1% to about 2.0% sodium arsenite and from about 0.5% to about 2.5% sodium metaborate based on the weight of the water-soluble alcohol.

3. An antifreeze composition consisting essentially of a water-soluble alcohol selected from the group consisting of ethylene glycol and methanol as the chief non-aqueous ingredient and an anticorrosion agent comprising as the essentially anticorrosive components from about 0.2% to about 77% of a compound selected from the group consisting of benzotriazole, alkali metal and ammonium salts of benzotriazole, mixtures of alkali metal and ammonium salts of benzotriazole, and N-alkyl benzotriazole, from about 2.2% to about 80% sodium arsenate, and from about 11% to about 96% sodium metaborate, which anticorrosion agent is present in the antifreeze composition in an amount sufficient to produce concentrations of from about 0.01% to about 2.0% of the benzotriazole compound, from about 0.1% to about 2.0% sodium arsenate and from about 0.5% to about 2.5% sodium metaborate based on the weight of the water-soluble alcohol.

4. An antifreeze composition consisting essentially of a water-soluble alcohol selected from the group consisting of ethylene glycol and methanol as the chief non-aqueous ingredient and an anticorrosion agent comprising as the essential anticorrosion components from about 0.2% to about 77% of a compound, from about 2.2% to about 80% sodium molybdate, and from about 11% to about 96% sodium metaborate, which anticorrosion agent is present in the antifreeze composition in an amount sufficient to produce concentrations of from about 0.01% to about 2.0% of the benzotriazole compound selected from the group consisting of benzotriazole, alkali metal and ammonium salts of benzotriazole, mixtures of alkali metal and ammonium salts of benzotriazole, and N-alkyl benzotriazole, from about 0.1% to about 2.0% sodium molybdate and from about 0.5% to about 2.5% sodium metaborate based on the weight of the water-soluble alcohol.

5. An antifreeze composition consisting essentially of a water-soluble alcohol selected from the group consisting of ethylene glycol and methanol as the chief non-aqueous ingredient and an anticorrosion agent comprising as the essential anticorrosive components from about 0.2% to about 77% of a compound selected from the group consisting of benzotriazole, alkali metal and ammonium salts of benzotriazole, mixtures of alkali metal and ammonium salts of benzotriazole, and N-alkyl benzotriazole, from about 2.2% to about 80% sodium arsenite, and from about 11% to about 96% sodium tetraborate, which anticorrosion agent is present in the antifreeze composition in an amount sufficient to produce concentrations of from about 0.01% to about 2.0% of the benzotriazole compound, from about 0.1% to about 2.0% sodium arsenite and from about 0.5% to about 2.5% sodium tetraborate based on the weight of the water-soluble alcohol.

6. An antifreeze composition consisting essentially of a water-soluble alcohol selected from the group consisting of ethylene glycol and methanol as the chief non-aqueous ingredient and an anticorrosion agent comprising as the essential anticorrosive components from about 0.2% to about 77% of a compound selected from the group consisting of benzotriazole, alkali metal and ammonium salts of benzotriazole, mixtures of alkali metal and ammonium salts of benzotriazole, and N-alkyl benzotriazole, from about 2.2% to about 80% sodium molybdate, and from about 11% to about 96% sodium tetraborate, which anticorrosion agent is present in the antifreeze composition in an amount sufficient to produce concentrations of from about 0.01% to about 2.0% of the benzotriazole compound, from about 0.1% to about 2.0% sodium molybdate and from about 0.5% to about 2.5% sodium tetraborate based on the weight of the water-soluble alcohol.

References Cited in the file of this patent

UNITED STATES PATENTS

| | | |
|---|---|---|
| 1,638,710 | Sherbino | Aug. 9, 1927 |
| 2,147,395 | Bayes | Feb. 14, 1939 |
| 2,147,409 | Lamprey | Feb. 14, 1939 |
| 2,384,553 | Kiffer | Sept. 11, 1945 |
| 2,534,030 | Keller | Dec. 12, 1950 |
| 2,618,608 | Schaeffer | Nov. 18, 1952 |

OTHER REFERENCES

Hackh's "Chemical Dictionary," third edition (1944), page 118.

UNITED STATES PATENT OFFICE

CERTIFICATE OF CORRECTION

Patent No. 2,803,604  
August 20, 1957

Arthur D. Meighen

It is hereby certified that error appears in the printed specification of the above numbered patent requiring correction and that the said Letters Patent should read as corrected below.

Column 9, lines 9 to 12, strike out "selected from the group consisting of benzotriazole, alkali metal and ammonium salts of benzotriazole, mixtures of alkali metal and ammonium salts of benzotriazole, and N-alkyl benzotriazole", and insert the same after "compound" and before the comma in line 3, same column.

Signed and sealed this 12th day of November 1957.

(SEAL)  
Attest:

KARL H. AXLINE  
Attesting Officer

ROBERT C. WATS  
Commissioner of Paten